United States Patent
Park et al.

(10) Patent No.: US 11,635,650 B2
(45) Date of Patent: Apr. 25, 2023

(54) OPTICAL DEVICE

(71) Applicant: LG Chem, Ltd., Seoul (KR)

(72) Inventors: Ji Hoon Park, Daejeon (KR); Young Shin Lee, Daejeon (KR); Moon Soo Park, Daejeon (KR)

(73) Assignee: LG Chem, Ltd.

( * ) Notice: Subject to any disclaimer, the term of this patent is extended or adjusted under 35 U.S.C. 154(b) by 0 days.

(21) Appl. No.: 17/426,891

(22) PCT Filed: Jan. 14, 2020

(86) PCT No.: PCT/KR2020/000665
§ 371 (c)(1),
(2) Date: Jul. 29, 2021

(87) PCT Pub. No.: WO2020/175795
PCT Pub. Date: Sep. 3, 2020

(65) Prior Publication Data
US 2022/0100026 A1    Mar. 31, 2022

(30) Foreign Application Priority Data
Feb. 25, 2019    (KR) .......................... 10-2019-0021757

(51) Int. Cl.
  *G02F 1/133*    (2006.01)
  *G02F 1/1335*   (2006.01)
  *E06B 9/24*     (2006.01)
  *G02F 1/1333*   (2006.01)
(52) U.S. Cl.
  CPC .......... *G02F 1/133502* (2013.01); *E06B 9/24* (2013.01); *G02F 1/13336* (2013.01)
(58) Field of Classification Search
  CPC ... G02F 1/133502; G02F 1/13336; E06B 9/24
  See application file for complete search history.

(56) References Cited

U.S. PATENT DOCUMENTS 4,930,876 A * 6/1990 Suzuki ............... G02F 1/1345
                                              349/158
5,790,215 A   8/1998 Sugahara et al.
(Continued)

FOREIGN PATENT DOCUMENTS

CN    102289105 A    12/2011
CN    104460039 A     3/2015
(Continued)

OTHER PUBLICATIONS

International Search Report for Application No. PCT/KR2020/000665, dated May 4, 2020, 2 pages.
(Continued)

*Primary Examiner* — Donald L Raleigh
(74) *Attorney, Agent, or Firm* — Lerner David LLP (57) ABSTRACT

An optical device is disclosed herein. In some embodiments, an optical device includes a first base film and a second base film, a light modulation layer existing between the first and second base films, electrode layers formed on surfaces of the first and second base films that face the light modulation layer, wherein each electrode layer comprises a first region capable of applying an electric field to the light modulation layer, and a second region connecting the electrode layer to an external power source, wherein the second region on the first base film and the second region on the second base film face each other, and an insulating layer disposed between the facing second regions of the first and second base films. The optical device is capable of preventing defects such as short circuits even when an external power source has been connected in an encapsulated structure.

13 Claims, 3 Drawing Sheets

(56) References Cited

U.S. PATENT DOCUMENTS

| | | | |
|---|---|---|---|
| 6,239,778 B1 | 5/2001 | Palffy-Muhoray et al. | |
| 6,952,394 B1 * | 10/2005 | Kim | H04L 1/0071 370/208 |
| 8,531,641 B2 | 9/2013 | Lee et al. | |
| 2006/0291030 A1 | 12/2006 | Niiyama et al. | |
| 2010/0231830 A1 | 9/2010 | Hirakata et al. | |
| 2011/0211157 A1 | 9/2011 | Kosa et al. | |
| 2015/0081016 A1 | 3/2015 | De Sio et al. | |
| 2016/0026026 A1 * | 1/2016 | Kim | G02F 1/13725 349/123 |
| 2016/0170097 A1 | 6/2016 | Milton et al. | |
| 2016/0259222 A1 * | 9/2016 | Taniguchi | G02F 1/136259 |
| 2019/0235301 A1 * | 8/2019 | Park | G02F 1/13725 |

FOREIGN PATENT DOCUMENTS

| | | | | |
|---|---|---|---|---|
| CN | 105683784 A | 6/2016 | | |
| CN | 108873487 A | 11/2018 | | |
| JP | 2004182484 A | 7/2004 | | |
| JP | 2007004085 A | 1/2007 | | |
| JP | 2017194599 A | 10/2017 | | |
| KR | 100200258 B1 | 6/1999 | | |
| KR | 20180119517 A | * | 11/2018 | ........ G02F 1/133528 |
| KR | 20180119517 A | | 11/2018 | |
| WO | 9418599 A1 | 8/1994 | | |
| WO | 2018199619 A1 | 11/2018 | | |

OTHER PUBLICATIONS

Taiwanese Search Report for Application No. 109101258, dated Nov. 24, 2020, 1 page.

Extended European Search Report and European Search Opinion for European Patent Application No. 20763907.1 dated Mar. 16, 2022, 13 pgs.

Search Report dated May 5, 2022 from the Office Action for Chinese Application No. 2020800118806 dated May 10, 2022, 2 pgs.

* cited by examiner

OPTICAL DEVICE

CROSS-REFERENCE TO RELATED APPLICATIONS

This application is a national phase entry under 35 U.S.C. § 371 of International Application No. PCT/KR2020/000665, filed on Jan. 14, 2020, which claims priority from Korean Patent Application No. 10-2019-0021757 filed on Feb. 25, 2019, the disclosures of which are incorporated herein by reference.

TECHNICAL FIELD

The present application relates to an optical device.

BACKGROUND ART

Various optical devices designed to be capable of varying transmittance using liquid crystal compounds are known.

For example, transmittance-variable devices using a so-called GH (guest host) manner, to which a mixture of a host material, which is mainly a liquid crystal compound, and a dichroic dye guest is applied, are known, and in the device, a liquid crystal compound is mainly used as the host material. Such transmittance-variable devices are applied to various applications including eyewear such as sunglasses and eyeglasses, outward walls of a building or sunroofs of a vehicle, and the like, as well as general display devices such as TVs or monitors.

DISCLOSURE

Technical Problem

In order to expand the applications of the optical device, a structure, in which an optical film is encapsulated through an encapsulant or the like, may be considered. In the case of such a structure, a certain level of pressure may be applied to the optical film by encapsulation with the encapsulant. In the case where the optical film has a structure including electrode layers facing each other, the electrode layers, which must be spaced apart from each other, may be at least partially contacted with each other by the pressure, which may cause a problem in driving the optical device. Therefore, it is one object of the present application to provide an optical device which can solve such a problem.

Technical Solution

Hereinafter, with reference to the accompanying drawings and the like, the present application will be described in detail. The accompanying drawings show exemplary embodiments of the present application, which are provided to assist in understanding the present application. In the accompanying drawings, the thicknesses may be enlarged in order to clearly represent the respective layers and regions, and the scope of the present application is not limited by the thicknesses, sizes and ratios, and the like shown in the drawings.

Among physical properties mentioned in this specification, when the measurement temperature or pressure affects the results, the relevant physical properties are measured at normal temperature and normal pressure, unless otherwise specified.

In this specification, the term "normal temperature" is a natural temperature without warming or cooling, which may generally be any temperature in a range of about 10° C. to 30° C., or a temperature of about 23° C. or about 25° C. or so.

In this specification, the term "normal pressure" is a natural pressure that is not particularly reduced or increased, which generally means a pressure of about 1 atmosphere, such as atmospheric pressure.

Figure 1:
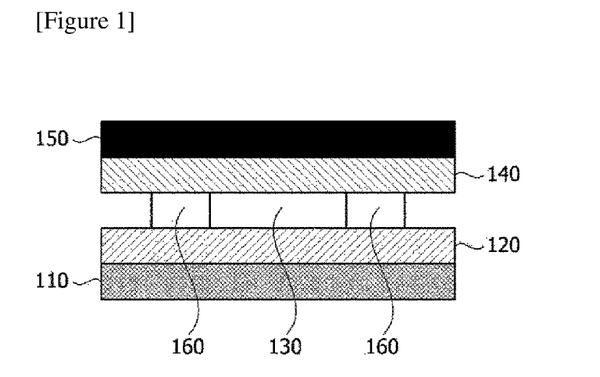
FIG. 1 is a side view of an exemplary optical film.

The present application relates to an optical device. The optical device may comprise an optical film. FIG. 1 is a diagram illustrating an exemplary optical film of the present application. Referring to FIG. 1, the optical film of the present application may comprise a first base film (110) and a second base film (150) disposed to face each other, and a light modulation layer (130) existing between the first and second base films (110, 150). Here, first and second electrode layers (120, 140) may be formed on surfaces of the first and second base films (110, 150) facing each other, respectively.

As the base film, for example, an inorganic film made of glass or the like, or a plastic film can be used. As the plastic film, a TAC (triacetyl cellulose) film; a COP (cycloolefin copolymer) film such as norbornene derivatives; an acryl film such as PMMA (poly(methyl methacrylate); a PC (polycarbonate) film; a PE (polyethylene) film; a PP (polypropylene) film; a PVA (polyvinyl alcohol) film; a DAC (diacetyl cellulose) film; a Pac (polyacrylate) film; a PES (polyether sulfone) film; a PEEK (polyetheretherketone) film; a PPS (polyphenylsulfone) film, a PEI (polyetherimide) film; a PEN (polyethylenenaphthatate) film; a PET (polyethylene terephthalate) film; a PI (polyimide) film; a PSF (polysulfone) film; a PAR (polyarylate) film or a fluororesin film and the like can be used, without being limited thereto. A coating layer of gold, silver, or a silicon compound such as silicon dioxide or silicon monoxide, or a coating layer such as an antireflection layer may also be present on the base film, if necessary.

As the base film, a film having a phase difference in a predetermined range may be used. In one example, the base film may have a front phase difference of 100 nm or less. In another example, the front phase difference may be about 95 nm or less, about 90 nm or less, about 85 nm or less, about 80 nm or less, about 75 nm or less, about 70 nm or less, about 65 nm or less, about 60 nm or less, about 55 nm or less, about 50 nm or less, about 45 nm or less, about 40 nm or less, about 35 nm or less, about 30 nm or less, about 25 nm or less, about 20 nm or less, about 15 nm or less, about 10 nm or less, about 5 nm or less, about 4 nm or less, about 3 nm or less, about 2 nm or less, about 1 nm or less, or about 0.5 nm or less. In another example, the front phase difference may be about 0 nm or more, about 1 nm or more, about 2 nm or more, about 3 nm or more, about 4 nm or more, about 5 nm or more, about 6 nm or more, about 7 nm or more, about 8 nm or more, about 9 nm or more, or about 9.5 nm or more.

An absolute value of a thickness direction phase difference of the base film may be, for example, 200 nm or less. The absolute value of the thickness direction phase difference may be 190 nm or less, 180 nm or less, 170 nm or less, 160 nm or less, 150 nm or less, 140 nm or less, 130 nm or less, 120 nm or less, 110 nm or less, 100 nm or less, 90 nm or less, 85 nm or less, 80 nm or less, 70 nm or less, 60 nm or less, 50 nm or less, 40 nm or less, 30 nm or less, 20 nm or less, 10 nm or less, 5 nm or less, 4 nm or less, 3 nm or less, 2 nm or less, 1 nm or less, or 0.5 nm or less, and may be 0 nm or more, 10 nm or more, 20 nm or more, 30 nm or more, 40 nm or more, 50 nm or more, 60 nm or more, 70 nm or more, or 75 nm or more. The thickness direction phase difference may be negative, or may be positive, if the absolute value is within the above range, and for example, may be negative.

As used herein, the term "front phase difference (Rin)" is a numerical value calculated by the following equation 1, and the term "thickness direction phase difference (Rth)" is a numerical value calculated by the following equation 2, unless otherwise specified. The reference wavelength of the front and thickness direction phase difference is about 550 nm.

$$\text{Front phase difference } (Rin) = d \times (nx - ny) \quad \text{[Equation 1]}$$

$$\text{Thickness direction phase difference } (Rth) = d \times (nz - ny) \quad \text{[Equation 2]}$$

In Equations 1 and 2, d is the thickness of the base film, nx is the refractive index in the slow axis direction of the base film, ny is the refractive index in the fast axis direction of the base film, and nz is the refractive index in the thickness direction of the base film.

When the base film is optically anisotropic, the angle formed by the slow axes of the base films disposed opposite to each other may be, for example, in a range of about −10 degrees to 10 degrees, in a range of −7 degrees to 7 degrees, in a range of −5 degrees to 5 degrees or in a range of −3 degrees to 3 degrees, or may be approximately parallel. In addition, the angle formed by the slow axis of the base film and a light absorption axis of a polarizing layer to be described below may be, for example, in a range of about −10 degrees to 10 degrees, in a range of −7 degrees to 7 degrees, in a range of −5 degrees to 5 degrees or in a range of −3 degrees to 3 degrees, or may be approximately parallel, or may be in a range of about 80 degrees to 100 degrees, in a range of about 83 degrees to 97 degrees, in a range of about 85 degrees to 95 degrees or in a range of about 87 degrees to 92 degrees, or may be approximately vertical.

It is possible to realize the optically excellent and uniform transparent and black modes through the phase difference adjustment or the arrangement of the slow axes.

The base film may have a coefficient of thermal expansion of 100 ppm/K or less. In another example, the coefficient of thermal expansion may be 95 ppm/K or less, 90 ppm/K or less, 85 ppm/K or less, 80 ppm/K or less, 75 ppm/K or less, 70 ppm/K or less, or 65 ppm/K or less, or may be 10 ppm/K or more, 20 ppm/K or more, 30 ppm/K or more, 40 ppm/K or more, 50 ppm/K or more, or 55 ppm/K or more. For example, the coefficient of thermal expansion of the base film may be measured in accordance with the provisions of ASTM D696, may be calculated by tailoring the film in the form provided in the relevant standard and measuring the change in length per unit temperature, or may be measured by a known method such as TMA (thermomechanic analysis).

As the base film, a base film having an elongation at break of 90% or more may be used. The elongation at break may be 95% or more, 100% or more, 105% or more, 110% or more, 115% or more, 120% or more, 125% or more, 130% or more, 135% or more, 140% or more, 145% or more, 150% or more, 155% or more, 160% or more, 165% or more, 170% or more, or 175% or more, and may be 1,000% or less, 900% or less, 800% or less, 700% or less, 600% or less, 500% or less, 400% or less, 300% or less, or 200% or less. The elongation at break of the base film may be measured in accordance with ASTM D882 standard, and may be measured by tailoring the film in the form provided by the corresponding standard and using equipment capable of measuring stress-strain curve (capable of simultaneously measuring force and length).

By selecting the base film to have the coefficient of thermal expansion and/or elongation at break, an optical device having excellent durability can be provided.

The thickness of the base film in the optical film is not particularly limited, and may typically be in the range of about 50 μm to 200 μm or so.

In this specification, the first base film on which the first electrode layer is formed may be referred to as a first electrode base film, and the second base film on which the second electrode layer is formed may be referred to as a second electrode base film.

The electrode base film may have translucency, for example, in a visible light region. In one example, the electrode base film may have transmittance of 80% or more, 85% or more, or 90% or more for light having any one wavelength in the visible light region, for example, a range of about 400 nm to 700 nm, or a wavelength of 550 nm. The higher the numerical value of the transmittance is, the more advantageous it is, whereby the upper limit is not particularly limited, and for example, the transmittance may also be about 100% or less or less than 100% or so.

The material of the electrode layer formed on the electrode base film is not particularly limited, which may be used without particular limitation as long as it is a material applied to forming electrode layers in the field of optical devices.

For example, as the electrode layer, an electrode layer formed using metal oxides; metal wires; metal nanotubes; metal meshes; carbon nanotubes; graphene; or a conductive polymer or a composite material thereof, and the like may be applied.

In one example, as the electrode layer, a metal oxide layer comprising one or more metals selected from the group consisting of antimony (Sb), barium (Ba), gallium (Ga), germanium (Ge), hafnium (Hf), indium (In), lanthanum (La), magnesium (Mg), selenium (Se), aluminum (Al), silicon (Si), tantalum (Ta), titanium (Ti), vanadium (V), yttrium (Y), zinc (Zn) and zirconium (Zr) may be used.

The thickness of the electrode layer may be appropriately selected within a range without impairing the object of the present application. Typically, the thickness of the electrode layer may be in a range of 50 nm to 300 nm or in a range of 70 nm to 200 nm, but is not limited thereto. The electrode layer may be a single-layered structure or a laminated structure made of the above-described material, and in the case of the laminated structure, the materials constituting the respective layers may be the same or different.

The electrode base film may be obtained by forming the electrode layer on the first and second base films.

In the present application, the electrode layer may comprise a part (hereinafter, may be referred to as a first region) for applying an electric field corresponding to external energy to the light modulation layer and a part (hereinafter, may be referred to as a second region) for connecting the electrode layer with an external power source so as to be capable of applying the electric field. The two parts may be parts that are physically separated from each other or parts that are physically continuous, or may also be parts that overlap each other substantially. Typically, in the structure of the optical device, the first region may be approximately a region overlapping with the light modulation layer when the optical device is observed along the normal direction of the surface, and the second region may be a region where external terminals or the like are formed.

In one example of the present application, the second region of the electrode layer (120) on the first base film (110) and the second region of the electrode layer (140) on the second base film (150) may be disposed so as not to face each other, whereby the first base film (110) and the second base film (150) may be included in the optical film to alternate from each other. This case may be referred to as a first aspect of the present application.

Figure 2:
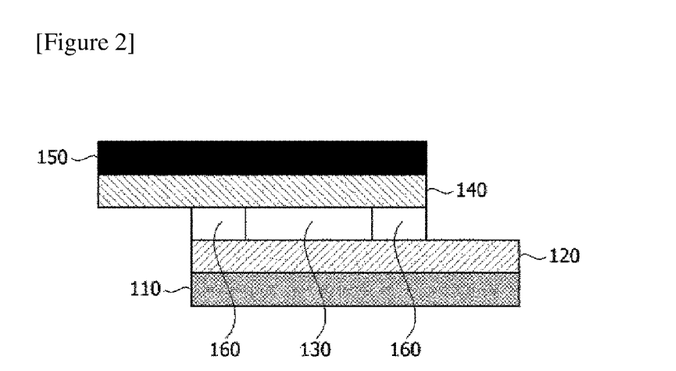
FIGS. 2 to 8 are diagrams for explaining formation forms of electrode layers.

FIG. 2 is a schematic side view of an optical film in such a state. By alternately disposing the base films (110, 150) from each other as in FIG. 2, the electrode layers (120, 140) formed on their surfaces, respectively also alternate from each other, the second region is formed by forming terminals and the like on the surface of the electrode layer (for example, the electrode layer (120) in the region indicated by 200 in FIG. 3) on the side, the electrode layer (120) on the first base film (110) of which does not face the electrode layer (140) on the second base film (150), and the second region is equally formed by forming terminals and the like on the electrode layer (for example, the surface of the electrode layer (140) in the region indicated by 200 in FIG. 3) on the side, the electrode layer (140) on the second base film (150) of which does not face the electrode layer (120) on the first base film (110), whereby the structure may be derived. The structure of FIG. 2 is one example of an arrangement of base films for forming second regions not facing each other, and various structures may be applied in addition to the structures of FIGS. 2 and 3 if the same purpose is achieved. Also, in the case of the structures of FIGS. 2 and 3, the degree (for example, the length of the region indicated by 200 in FIG. 3) of alternately disposing the base films from each other is not particularly limited, where the arrangement appropriately alternating from each other may be adopted in consideration of the area required for the light modulation layer (130) or the area for forming terminals, and the like.

Figure 3:
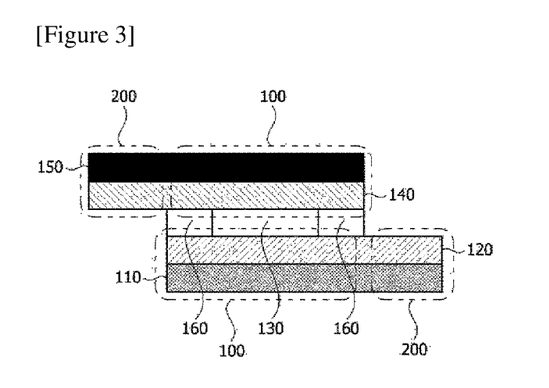

The optical film may further comprise a sealant (160) attaching the first and second base films (110, 150) to each other, where the sealant (160) may attach the first and second base films in a state in which as in the drawings, it is present at the boundary of the first and second regions on the first base film (110) and the outermost part of at least one surface of the first base film (110) and also it is present at the boundary of the first and second regions on the second base film (150) and the outermost side of at least one surface of the second base film (150).

In another example, the electrode layer may be patterned. For example, in the present application, the second region of each electrode layer may be patterned into a region A electrically connected to the first region and a region B not electrically connected to the first region. That is, when the region A is connected to the external power source, electric currents flow to the first region, but when the region B is connected to the external power source, no electric current flows to the first region. In this case, the region A formed on the first base film and the region A formed on the second base film may be disposed so as not to face each other. This case may be referred to as a second aspect of the present application.

Also, in this case, the second region may be formed to surround the first region.

Furthermore, in this case, the sealant which attaches the first and second base films to each other may attach the first and second base films while being present at the boundary between the first and second regions of the base film.

Figure 4:
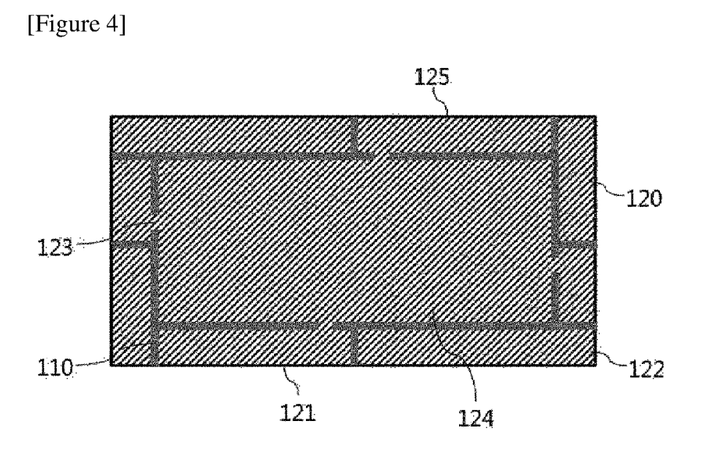
Figure 5:
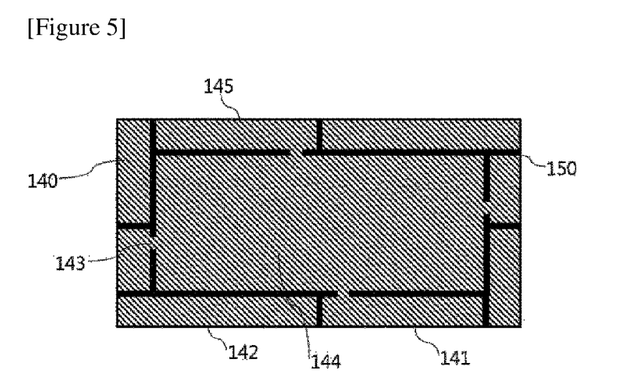

Hereinafter, the shape of the electrode layer as above will be illustratively described with reference to the drawings. FIGS. 4 and 5 are examples of electrode layers formed on first and second base films, respectively. However, in the present application, the shape of the formed electrode layer is not limited to the structures shown in FIGS. 4 and 5.

FIG. 4 may be an example of any one electrode layer among the electrode layers formed on the first and second base films, respectively, and FIG. 5 may be an example of another electrode layer. In order to specifically explain the arrangement of the electrode layers in the optical film of the present application, FIG. 4 is the electrode layer formed on the base film observed from the side of the surface on which the electrode layer is formed, and FIG. 5 is a perspective view of the electrode layer formed on the base film observed from the surface where the electrode layer of the base film is not formed.

FIGS. 4 and 5 have been shown, as described above, to explain how the electrode layers are disposed when they are disposed oppositely.

As shown in FIGS. 4 and 5, the electrode layer may comprise a plurality of compartment structures and at least one passage structure. In the present application, the compartment structure of the electrode layer may mean an electrode unit formed on the base film, and the compartment structure and the other compartment structures may refer to units that are not electrically connected to each other unless there are passage structures to be described below. For example, they may include compartment structures (121, 122, 141, 142) shown in FIGS. 4 and 5. In the present application, the "passage structure" of the electrode layer may refer to an element that electrically connects two compartment structures to each other among the above-described compartment structures. The passage structure may refer to, for example, the passage structures (123, 143) shown in FIGS. 4 and 5. Therefore, when the external power source is connected to the electrode layer, the compartment structure directly connected to the external power source may be primarily charged, and the compartment structure electrically connected through the compartment structure connected to the external power source and the passage structure may be secondarily charged. Here, the compartment structure that is secondarily charged may be the first region as described above, and the compartment structure that is primarily charged may be the region A as described above. For example, when an external power source is connected to the compartment structures (122, 142) which are not electrically connected to other compartments by the passage structures (123, 143) among the compartment structures (121, 122, 141, 142), only the structures (122, 142) are charged, the other compartment structures (121, 141) are not charged. Such compartment structures (122, 142) may be the region B as described above. In another example, when an external power source is connected to the compartment structures (121, 141) electrically connected to other compartments by passage structures among the compartment structures, not only the compartment structures (121, 141)

directly connected to the external power source but also other compartment structures (122, 142) that are electrically connected by the passage structures are charged.

As shown in FIGS. 4 and 5, the plurality of compartment structures (121, 122, 125, 141, 142, 145) in the electrode layers (120, 140) of the present application may comprise central compartments (124, 144) where the light modulation layer (130) is positioned on the upper or lower part thereof. This central compartment may be the first region. The fact that the light modulation layer (130) is positioned on the upper or lower part of the central compartment (124, 144) structures may mean that as shown in FIG. 1, the light modulation layer (130) is positioned on the upper or lower part of the first and second electrode layers (120, 140), and in particular, the light modulation layer (130) is positioned on the upper or lower part of the central compartments (124, 144) in the first and second electrode layers (120, 140).

Figure 6:
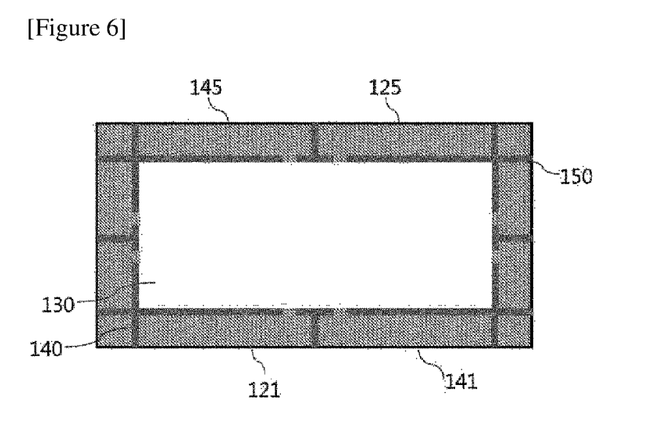

FIG. 6 is a diagram that components constituting an exemplary optical device of the present application are superimposed and drawn in order to explain the positional relationship of the central compartments (124, 144), the peripheral compartments (121, 122, 125, 141, 142, 145) and the light modulation layer (130), which has been depicted by penetrating or superimposing some components for convenience.

As shown in FIG. 6, the light modulation layer (130) may be positioned on the upper or lower part of the central compartments (124, 144) in the first and second electrode layers (120, 140).

The first and second electrode layers of the present application may comprise a peripheral compartment in which the light modulation layer is not positioned on the upper or lower part. As shown in FIG. 6, the peripheral compartments (121, 125, 141, 145) may mean compartment structures of the first and second transparent electrode layers in which the light modulation layer (130) is not positioned on the upper or lower part.

The passage structures of the first and second electrode layers of the present application may electrically connect the central compartment and at least one peripheral compartment. When the passage structure electrically connects the central compartment in which the light modulation layer is present at the upper or lower part and the peripheral compartment, the electric field may be applied to the light modulation layer by connecting an external power source to the peripheral compartment.

The first and second electrode layers may be formed such that when the light modulation layer has been projected on the charged region of any one electrode layer, the charged region that does not overlap with the area of the projected light modulation layer does not overlap with the charged region of the other electrode layer.

In one example, the first and second electrode layers (120, 140) may be formed as shown in FIGS. 4 and 5, respectively. In order for the charged regions of the first and second electrode layers (120, 140) shown in FIGS. 4 and 5 to satisfy the above-described condition, for example, the electrode layers (120, 140) should be laminated in the same manner as shown in FIG. 6.

As described above, FIG. 6 is a diagram for showing that the first and second electrode layers (120, 140) are formed such that when the light modulation layer (130) has been projected on the charged region of any one electrode layer (120, 140), the charged region that does not overlap with the area of the projected light modulation layer (130) does not overlap with the charged region of the other electrode layer (120, 140). FIG. 6 is a diagram of the optical device observed from the second base film (150) of the optical device illustrated in FIG. 1, which has been illustrated so that some components are penetrated to be overlapped with each other for convenience of description.

In the example, an external power source may be connected to the first and second electrode layers (120, 140) illustrated in FIG. 6, and for example, an external power source may be connected to the compartment structures (121, 141). Referring to the compartment structures and the passage structures shown in FIGS. 4 and 5, the compartment structures (121, 124, 125) of the first electrode layer (120) and the compartment structures (141, 144, 145) of the second electrode layer (140) are charged to form charged regions, when the external power source is connected to the first and second electrode layers (120, 140) as described above. Therefore, in reference to FIG. 6 in the example, when the light modulation layer (130) has been projected on the charged regions (121, 124, 125) of the first electrode layer (120), the charged regions (121, 125) that do not overlap with the area of the projected light modulation layer (130) do not overlap with the area in which the charged regions (141, 144, 145) of the second electrode layer (140) are projected onto the first electrode layer (120). As the electrode layers are formed as above, when the external power source has been connected to the electrode layer, a short circuit phenomenon does not occur even when the electrode layers contact each other.

Figure 7:
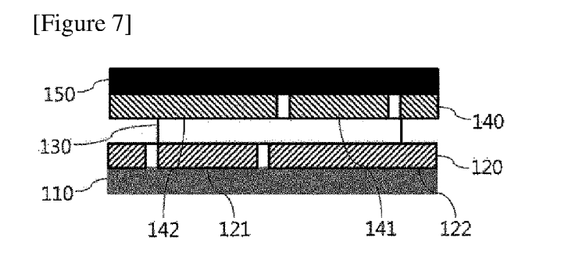

FIG. 7 is a diagram for explaining the principle that the optical device of the present application prevents a short circuit phenomenon. FIG. 7 is a diagram seen from the side of the compartment structures (121, 141) shown in FIG. 6. In the above-described example, when an external power source has been connected to the compartment structures (121, 141), the compartment structures (121, 141) constituting the charged regions are formed so as not to contact each other even in the case where a pressure is applied to the translucent electrode base films (110, 150), as shown in FIG. 7, and thus the optical device of the present application does not cause the short circuit phenomenon even when the first and second electrode layers (120, 140) contact each other. In the example, the reason is because the compartment structure (142), which may contact the compartment structure (121) constituting the charged region, is not electrically connected to the charged region as shown in FIG. 5, and the compartment structure (122), which may contact another compartment structure (141) constituting the charged region, is not electrically connected to the charged region as shown in FIG. 4.

In the example of the electrode layers as described above, the aforementioned central compartment is the first region and the peripheral compartment is the second region, where the compartment electrically connected to the central compartment among the peripheral compartments may be the region A and the compartment not electrically connected to the central compartment may be the region B.

Through the arrangement as in FIGS. 6 and 7, it is possible to implement a device disposed so that the region A on the first base film and the region A on the second base film do not face each other.

However, the structure shown in FIGS. 4 to 7 is one example that can implement the optical film of the present application.

The pattern of such an electrode layer may be formed by patterning the electrode layer or by forming the electrode layer once and then patterning the electrode layer by applying an appropriate means (for example, a laser patterning method or the like).

In another example, the first and second regions of the electrode layer may also be formed to face each other while being formed as in the first aspect of the present application. That is, in this case, the second region on the first base film and the second region on the second base film may be disposed to face each other, where an insulating layer may exist. This case may be referred to as a third aspect of the present application.

Figure 8:
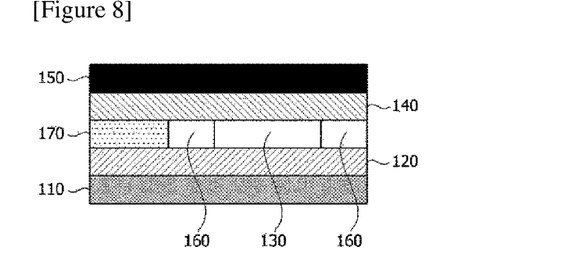

FIG. 8 exemplarily shows such a case, where the insulating layer (170) is present between the second regions of the respective electrode layers (140, 120) as shown in FIG. 8. FIG. 8 is an exemplary form, in which if necessary, a plurality of second regions may be formed in each electrode layer, and an insulating layer may also be present between them in a state where they are disposed to face each other.

That is, for example, on the surface of the base film, the second region may also be formed so as to surround the first region, where the insulating layer may exist between the respective second regions. In addition, such a structure further comprises a sealant (160 in FIG. 8) attaching the first and second base films to each other, wherein the sealant may attach the first and second base films while being present at the boundary between the first and second regions of the base films.

In such a structure, the kind of material that can be applied as the material of the insulating layer is not particularly limited. That is, various inorganic, organic or organic-inorganic composite materials known to be generally applicable as the insulating layer in the industry may be used as the insulating layer. Also, in the present application, the manner of forming such an insulating layer also follows the known contents.

As an insulating material, a material having an insulation breakdown voltage of about 3 kV/mm or more, about 5 kV/mm or more, about 7 kV/mm or more, 10 kV/mm or more, 15 kV/mm or more, or 20 kV/mm or more as measured according to ASTM D149 is used. As the insulation breakdown voltage has a higher numerical value, it shows more excellent insulation properties, which is not particularly limited, but the insulation breakdown voltage may be about 50 kV/mm or less, 45 kV/mm or less, 40 kV/mm or less, 35 kV/mm or less, or 30 kV/mm or less.

For example, ceramic materials such as glass, alumina, ZnO, AlN (aluminum nitride), BN (boron nitride), silicon nitride, SiC or BeO, polymer materials such as polyolefins, polyvinyl chloride, various rubber-based polymers, polyesters, acrylic resins or epoxy resins, or the like may be applied as the insulating layer.

The present application can provide a structure of an optical device that can prevent a short circuit when an external power source has been connected through such a configuration.

The optical film of the present application may comprise a light modulation layer between the first and second base films (that is, at least between the first regions of the electrode layers) in which the electrode layers are formed in such a form, respectively. In one example, such a light modulation layer may be an active liquid crystal layer having at least a liquid crystal compound. The term active liquid crystal layer is a layer comprising a liquid crystal compound, which may mean a layer capable of changing the oriented state of the liquid crystal compound through external energy. By using the active liquid crystal layer, the optical device may selectively switch between various modes including a transparent mode and a black mode, whereby the active liquid crystal layer may be a light modulation layer.

In this specification, the term transparent mode may mean a state where the transmittance is about 10% or more, about 15% or more, about 20% or more, about 25% or more, 30% or more, about 35% or more, about 40% or more, about 45% or more, or about 50% or more. In addition, the black mode may mean a state where the transmittance is about 20% or less, about 15% or less, about 10% or less, or about 5% or less or so. The higher the transmittance in the transparent mode is, the more advantageous it is, and the lower the transmittance in the black mode is, the more advantageous it is, so that each of the upper limit and the lower limit is not particularly limited. In one example, the upper limit of the transmittance in the transparent mode may be about 100%, about 95%, about 90%, about 85%, about 80%, about 75%, about 70%, about 65% or about 60%. The lower limit of the transmittance in the black mode may be about 0%, about 1%, about 2%, about 3%, about 4%, about 5%, about 6%, about 7%, about 8%, about 9%, or about 10%.

The transmittance may be linear light transmittance. The term linear light transmittance may be a ratio of, relative to light which is incident on the optical device in a predetermined direction, light (linear light) transmitted through the optical device in the same direction as the incident direction. In one example, the transmittance may be a result of measurement (normal light transmittance) with respect to light incident in a direction parallel to the surface normal of the optical device.

In the optical device, the light whose transmittance is controlled may be UV-A region ultraviolet light, visible light or near-infrared light. According to a commonly used definition, the UV-A region ultraviolet light is used to mean radiation having a wavelength in a range of 320 nm to 380 nm, the visible light is used to mean radiation having a wavelength in a range of 380 nm to 780 nm and the near-infrared light is used to mean radiation having a wavelength in a range of 780 nm to 2000 nm.

In this specification, the term external energy means energy applied from the outside to such a level that it can change the orientation of the liquid crystal compound included in the active liquid crystal layer. In one example, the external energy may be an electric field generated by an external voltage induced through the electrode layer.

For example, the active liquid crystal layer can switch between the transparent mode and the black mode as described above or between other modes while the oriented state of the liquid crystal compound is changed depending on whether or not the external energy is applied, the size and/or the application position thereof.

In one example, the active liquid crystal layer may be a liquid crystal layer referred to as a so-called guest host liquid crystal layer, where the active liquid crystal layer may further comprise an anisotropic dye together with the liquid crystal compound. The guest host liquid crystal layer is a liquid crystal layer using a so-called guest host effect, which is a liquid crystal layer that the anisotropic dye is aligned in accordance with an orientation direction of the liquid crystal compound (hereinafter, may be referred to as a liquid crystal host). The orientation direction of the liquid crystal host may be adjusted using an alignment film and/or the above-described external energy.

The type of liquid crystal host used in the liquid crystal layer is not particularly limited, and a general kind of liquid crystal compound applied for realizing the guest host effect may be used.

For example, as the liquid crystal host, a smectic liquid crystal compound, a nematic liquid crystal compound, or a cholesteric liquid crystal compound may be used. In general, a nematic liquid crystal compound may be used. The term nematic liquid crystal compound means a liquid crystal compound which has no regularity with respect to the position of the liquid crystal molecules but is capable of arranging all of them in the molecular axis direction, and such a liquid crystal compound may be in a rod form or may be in a discotic form.

As such a nematic liquid crystal compound, one having a clearing point of, for example, about 40° C. or more, about 50° C. or more, about 60° C. or more, about 70° C. or more, about 80° C. or more, about 90° C. or more, about 100° C. or more, or about 110° C. or more, or having a phase transition point in the above range, that is, a phase transition point to an isotropic phase on a nematic phase, can be selected. In one example, the clearing point or phase transition point may be about 160° C. or less, about 150° C. or less, or about 140° C. or less.

The liquid crystal compound may have dielectric constant anisotropy of a negative number or a positive number. The absolute value of the dielectric constant anisotropy can be appropriately selected in consideration of the object. For example, the dielectric constant anisotropy may be more than 3 or more than 7, or may be less than −2 or less than −3.

The liquid crystal compound may also have optical anisotropy (Δn) of about 0.01 or more, or about 0.04 or more. In another example, the optical anisotropy of the liquid crystal compound may be about 0.3 or less, or about 0.27 or less.

The usable liquid crystal compounds as the liquid crystal host of the guest host liquid crystal layer are known in the art.

When the liquid crystal layer is the guest host liquid crystal layer, the liquid crystal layer may comprise an anisotropic dye together with the liquid crystal host. The term "dye" may mean a material capable of intensively absorbing and/or modifying light in at least a part or the entire range in a visible light region, for example, a wavelength range of 380 nm to 780 nm, and the term "anisotropic dye" may mean a material capable of anisotropic absorption of light in at least a part or the entire range of the visible light region.

As the anisotropic dye, for example, known dyes known to have properties that can be aligned according to the aligned state of the liquid crystal host may be selected and used. For example, azo dyes or anthraquinone dyes and the like may be used as the anisotropic dye, and the liquid crystal layer may also comprise one or two or more dyes in order to achieve light absorption in a wide wavelength range.

A dichroic ratio of the anisotropic dye may be appropriately selected in consideration of the purpose. For example, the anisotropic dye may have a dichroic ratio in a range of 5 to 20. For example, in the case of a p-type dye, the term "dichroic ratio" may mean a value obtained by dividing absorption of polarized light parallel to the long axis direction of the dye by absorption of polarized light parallel to the direction perpendicular to the long axis direction. The anisotropic dye may have the dichroic ratio at least at some wavelengths or at any one wavelength or full range in the wavelength range of the visible region, for example, in the wavelength range of about 380 nm to 780 nm or about 400 nm to 700 nm.

The content of the anisotropic dye in the liquid crystal layer may be appropriately selected in consideration of the purpose. For example, the content of the anisotropic dye may be selected in a range of 0.1 to 10 wt % based on the total weight of the liquid crystal host and the anisotropic dye. The ratio of the anisotropic dye may be changed in consideration of the desired transmittance and the solubility of the anisotropic dye in the liquid crystal host, and the like.

The liquid crystal layer basically comprises the liquid crystal host and the anisotropic dye, and may further comprise other optional additives according to a known form, if necessary. As an example of the additive, a chiral dopant or a stabilizer can be exemplified, without being limited thereto.

For example, the thickness of the liquid crystal layer may be appropriately selected to be suitable for implementation of the desired mode. In one example, the thickness of the liquid crystal layer may be about 0.01 µm or more, 0.05 µm or more, 0.1 µm or more, 0.5 µm or more, 1 µm or more, 1.5 µm or more, 2 µm or more, 2.5 µm or more, 3 µm or more, 3.5 µm or more, 4 µm or more, 4.5 µm or more, 5 µm or more, 5.5 µm or more, 6 µm or more, 6.5 µm or more, 7 µm or more, 7.5 µm or more, 8 µm or more, 8.5 µm or more, 9 µm or more, or 9.5 µm or more. The upper limit of the thickness of the liquid crystal layer is not particularly limited, which may generally be about 30 µm or less, 25 µm or less, 20 µm or less, or 15 µm or less.

Such an active liquid crystal layer or the optical film comprising the same may switch between a first oriented state and a second oriented state different from the first oriented state. The switching can be controlled, for example, by the application of external energy, such as a voltage. For example, either of the first and second oriented states may be maintained in a state where a voltage is not applied and then switched to another oriented state by voltage application.

In one example, the first and second oriented states may be each selected from a horizontal orientation, vertical orientation, spray orientation, oblique orientation, twisted nematic orientation, or cholesteric orientation state. For example, in the black mode, the liquid crystal layer or the optical film may be at least in horizontal orientation, twisted nematic orientation or cholesteric orientation, and in the transparent mode, the liquid crystal layer or the optical film may be in a vertically oriented state, or a horizontally oriented state having optical axes of directions different from the horizontal orientation of the black mode. The liquid crystal element may be an element of a normally black mode in which the black mode is implemented in a state where a voltage is not applied, or may implement a normally transparent mode in which the transparent mode is implemented in a state where a voltage is not applied.

The active liquid crystal layer as above may have various modes. The active liquid crystal layer may be driven, for example, in an electrically controlled birefringence (ECB) mode, a twisted nematic (TN) mode or a super twisted nematic (STN) mode, but is not limited thereto, and alignment characteristics of the liquid crystal compound in the active liquid crystal layer may vary according to the driving mode of the active liquid crystal layer.

In one example, the liquid crystal compound in one oriented state of the active liquid crystal layer may be present in an oriented state to form any one angle with the absorption axis of a polarizing layer, which is described below, present in an oriented state to form horizontality or verticality to the absorption axis of the polarizing layer, or present in a twisted oriented state.

In this specification, the term "twisted oriented state" may mean a state where the optical axis of the active liquid crystal layer is horizontally oriented while having an inclination angle within a range of about 0 degrees to 15 degrees, about 0 degrees to 10 degrees or about 0 degrees to 5 degrees with respect to the plane of the active liquid crystal layer, but the angles in the major axis direction of the neighboring liquid crystal compound included in the active liquid crystal layer are arranged in such a manner that they are slightly changed and twisted.

As described above, the alignment property of the liquid crystal compound in the active liquid crystal layer may be changed by application of an external action.

In one example, when the active liquid crystal layer is in the horizontal orientation in the absence of external action, the transmittance may be increased by switching it to the vertically oriented state by the application of the external action.

In another example, when the active liquid crystal layer is in the vertical orientation in the absence of external action, the transmittance may be reduced by switching it to the horizontal alignment state by the application of the external action. In addition, in the switching it from the initial vertically oriented state to the horizontally oriented state, a pretilt in a predetermined direction may be required to determine the orientation direction of the liquid crystal compound. Here, the manner of imparting a pretilt is not particularly limited, and for example, it can be performed by disposing an appropriate alignment film so that the intended pretilt can be imparted.

Also, here, in the state where the active liquid crystal layer further comprises an anisotropic dye and the liquid crystal compound is vertically oriented, the alignment direction of the anisotropic dye is perpendicular to the plane of the polarizing layer existing below, and thus the light transmitting the polarizing layer can be transmitted without being absorbed by the anisotropic dye of the active liquid crystal layer, thereby increasing the transmittance of the optical device. On the other hand, in a state where the liquid crystal compound of the active liquid crystal layer is horizontally oriented, the alignment direction of the anisotropic dye is parallel to the plane of the polarizing layer existing below, and thus when the optical axis of the active liquid crystal layer is disposed to have a predetermined angle with respect to the absorption axis of the polarizing layer, a portion of the light transmitting the polarizing layer can be absorbed by the anisotropic dye, thereby reducing the transmittance of the optical device.

In one example, the optical device may implement a transparent mode with transmittance of 15% or more in the visible region in the presence of external action, and may implement a black mode with transmittance of 3% or less in the visible region in the absence of external action.

When the active liquid crystal layer is driven in the TN mode or the STN mode, the active liquid crystal layer may further comprise a chiral agent. The chiral agent may induce the molecular arrangement of the liquid crystal compound and/or the anisotropic dye to have a helical structure. The chiral agent may be used without particular limitation, as long as it can induce the desired helical structure without impairing liquid crystallinity, for example, nematic regularity. The chiral agent for inducing the helical structure in liquid crystals needs to include at least chirality in the molecular structure. The chiral agent may be exemplified by, for example, a compound having one or two or more asymmetric carbons, a compound having an asymmetric point on a heteroatom, such as a chiral amine or a chiral sulfoxide, or a compound having axially asymmetric and optically active sites such as cumulene or binaphthol. The chiral agent may be, for example, a low molecular weight compound having a molecular weight of 1,500 or less. As the chiral agent, commercially available chiral nematic liquid crystals, for example, chiral dopant liquid crystal S-811 available from Merck Co., Ltd. or LC756 available from BASF may also be used.

A method of confirming which direction the optical axis of the liquid crystal layer is formed in the oriented state of the liquid crystal layer is known. For example, the direction of the optical axis of the liquid crystal layer can be measured by using another polarizing plate whose optical axis direction is known, which can be measured using a known measuring instrument, for example, a polarimeter such as Pascal 2000 from Jasco.

A method of realizing the liquid crystal element of the normally transparent or black mode by adjusting the dielectric constant anisotropy of the liquid crystal host, the orientation direction of the alignment film for orienting the liquid crystal host, and the like is known.

The optical film may further comprise spacers for maintaining an interval of the two base films between the two base films and/or the sealant for attaching the base films in a state where the interval of two base films disposed opposite to each other is maintained, and the like. As the spacer and/or the sealant, a known material can be used without any particular limitation.

In the optical film, an alignment film may be present on one side of the base film, for example, the side facing the light modulation layer (for example, the active liquid crystal layer). For example, the alignment film may be present on the electrode layer.

The alignment film is a constitution for controlling orientation of the liquid crystal host included in the light modulation layer such as the active liquid crystal layer, and a known alignment film can be applied without particular limitation. As the alignment film known in the industry, there is a rubbing alignment film or a photo alignment film, and the like.

The orientation direction of the alignment film can be controlled to achieve the orientation of the above-described optical axis. For example, the orientation directions of two alignment films formed on each side of two base films disposed opposite to each other may form an angle in a range of about −10 degrees to 10 degrees, an angle in a range of −7 degrees to 7 degrees, an angle in a range of −5 degrees to 5 degrees or an angle in a range of −3 degrees to 3 degrees to each other, or may be approximately parallel to each other. In another example, the orientation directions of the two alignment films may form an angle in a range of about 80 degrees to 100 degrees, an angle in a range of about 83 degrees to 97 degrees, an angle in a range of about 85 degrees to 95 degrees or an angle in a range of about 87 degrees to 92 degrees, or may be approximately perpendicular to each other.

Since the direction of the optical axis of the active liquid crystal layer is determined in accordance with such an orientation direction, the orientation direction can be confirmed by checking the direction of the optical axis of the active liquid crystal layer.

The optical device may further comprise a polarizing layer together with the optical film. As the polarizing layer, for example, an absorption type polarizing layer, that is, a polarizing layer having a light absorption axis formed in one direction and a light transmission axis formed substantially perpendicular thereto may be used.

Assuming that the blocking state is implemented in the first oriented state of the optical film, the polarizing layer may be disposed such that the angle formed by the average optical axis (vector sum of optical axes) at the first oriented state and the light absorption axis of the polarizing layer is 80 degrees to 100 degrees or 85 degrees to 95 degrees, or it is approximately perpendicular, or may be disposed such that it is 35 degrees to 55 degrees or about 40 degrees to 50 degrees or approximately 45 degrees.

When the orientation direction of the alignment film is used as a reference, the orientation directions of the alignment films formed on each side of the two base films of the optical film disposed opposite to each other as described above may form, to each other, an angle in a range of about −10 degrees to 10 degrees, an angle in a range of −7 degrees to 7 degrees, an angle in a range of −5 degrees to 5 degrees or an angle in a range of −3 degrees to 3 degrees, or in the case of being approximately parallel to each other, the angle formed by the orientation direction of any one of the two alignment films and the light absorption axis of the polarizing layer may be 80 degrees to 100 degrees or 85 degrees to 95 degrees, or may be approximately perpendicular.

In another example, the orientation directions of the two alignment films may form an angle in a range of about 80 degrees to 100 degrees, an angle in a range of about 83 degrees to 97 degrees, an angle in a range of about 85 degrees to 95 degrees or an angle in a range of about 87 degrees to 92 degrees, or in the case of being approximately vertical to each other, the angle formed by the orientation direction of the alignment film disposed closer to the polarizing layer of the two alignment films and the light absorption axis of the polarizing layer may be 80 degrees to 100 degrees or 85 degrees to 95 degrees, or may be approximately perpendicular.

For example, the optical film and the polarizing layer may be in a state of being laminated with each other. In addition, they may be disposed in the state such that the optical axis (average optical axis) in the first orientation direction of the optical film and the light absorption axis of the polarizing layer become the above relationship.

In one example, when the polarizing layer is a polarizing coating layer to be described below, a structure in which the polarizing coating layer is present inside the optical film may be implemented. For example, a structure in which the polarizing coating layer is present between any one of the base films of the optical film and the light modulation layer may be implemented. For example, the electrode layer, the polarizing coating layer and the alignment film may be sequentially formed on at least one of the two base films of the optical film.

The kind of the polarizing layer that can be applied in the optical device is not particularly limited. For example, as the polarizing layer, a conventional material used in conventional LCDs or the like, such as a PVA (poly(vinyl alcohol)) polarizing layer, or a polarizing layer implemented by a coating method such as a polarizing coating layer comprising lyotropic liquid crystals (LLCs) or reactive mesogens (RMs) and a dichroic dye can be used. In this specification, the polarizing layer implemented by the coating method as described above may be referred to as a polarizing coating layer. As the lyotropic liquid crystal, a known liquid crystal may be used without any particular limitation, and for example, a lyotropic liquid crystal capable of forming a lyotropic liquid crystal layer having a dichroic ratio of 30 to 40 or so may be used. On the other hand, when the polarizing coating layer contains reactive mesogens (RMs) and a dichroic dye, as the dichroic dye, a linear dye may be used, or a discotic dye may also be used.

The optical device of the present application may comprise only one optical film and one polarizing layer as described above, or may comprise two or more of any of them. Thus, in one example, the optical device may comprise only one optical film and only one polarizing layer, but is not limited thereto.

For example, the optical device of the present application may comprise two opposing polarizing layers, and may also have a structure in which the light modulation layer is present between the two polarizing layers. In this case, the absorption axes of the two opposing polarizing layers (first and second polarizing layers) may be vertical or horizontal to each other. Here, the verticality and horizontality are substantial verticality and horizontality, respectively, which can be understood to include an error within ±5 degrees, ±4 degrees, ±3 degrees or ±2 degrees.

The optical device may further comprise two outer substrates disposed opposite to each other. In this specification, one of the two outer substrates may be referred to as a first outer substrate and the other may be referred to as a second outer substrate for the sake of convenience, but the first and second representations do not define the order or vertical relationship of the outer substrates.

Figure 9:
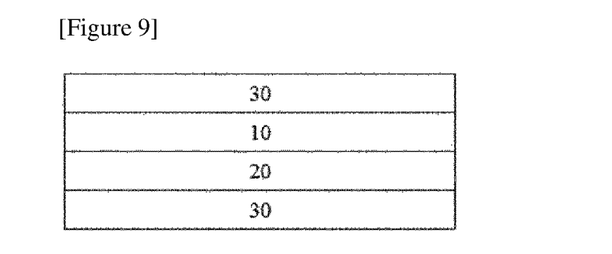
FIGS. 9 to 11 are side views of exemplary optical elements.

In one example, the optical film or the optical film and the polarizing layer may be encapsulated between the two outer substrates. Such encapsulation may be performed using an adhesive film. For example, as shown in FIG. 9, the optical film (10) and the polarizing layer (20) may exist between the two substrates (30) disposed opposite to each other.

As the outer substrate, for example, an inorganic substrate made of glass or the like, or a plastic substrate can be used. As the plastic substrate, a TAC (triacetyl cellulose) film; a COP (cycloolefin copolymer) film such as norbornene derivatives; an acryl film such as PMMA (poly(methyl methacrylate); a PC (polycarbonate) film; a PE (polyethylene) film; a PP (polypropylene) film; a PVA (polyvinyl alcohol) film; a DAC (diacetyl cellulose) film; a Pac (polyacrylate) film; a PES (polyether sulfone) film; a PEEK (polyetheretherketone) film; a PPS (polyphenylsulfone) film, a PEI (polyetherimide) film; a PEN (polyethylenenaphthatate) film; a PET (polyethylene terephthalate) film; a PI (polyimide) film; a PSF (polysulfone) film; a PAR (polyarylate) film or a fluororesin film and the like can be used, without being limited thereto. A coating layer of gold, silver, or a silicon compound such as silicon dioxide or silicon monoxide, or a coating layer such as an antireflection layer may also be present on the outer substrate, if necessary.

The thickness of the outer substrate is not particularly limited, and for example, may be about 0.3 mm or more. In another example, the thickness may be about 0.5 mm or more, about 1 mm or more, about 1.5 mm or more, or about 2 mm or more or so, and may also be 10 mm or less, 9 mm or less, 8 mm or less, 7 mm or less, 6 mm or less, 5 mm or less, 4 mm or less, or 3 mm or less or so.

The outer substrate may be a flat substrate or may be a substrate having a curved surface shape. For example, the two outer substrates may be simultaneously flat substrates, simultaneously have a curved surface shape, or any one may be a flat substrate and the other may be a substrate having a curved surface shape.

In addition, here, in the case of having the curved surface shape at the same time, the respective curvatures or curvature radii may be the same or different.

In this specification, the curvature or curvature radius may be measured in a manner known in the industry, and for example, may be measured using a contactless apparatus such as a 2D profile laser sensor, a chromatic confocal line sensor or a 3D measuring confocal microscopy. The method of measuring the curvature or curvature radius using such an apparatus is known.

Also, in relation to the substrate, for example, when the curvatures or curvature radii on the front surface and the back surface are different, the respective curvatures or curvature radii of the opposing surfaces, that is, the curvature or curvature radius of the surface facing the second outer substrate in the case of the first outer substrate and the curvature or curvature radius of the surface facing the first outer substrate in the case of the second outer substrate may be a reference. Furthermore, when the relevant surface has portions that the curvatures or curvature radii are not constant and different, the largest curvature or curvature radius, or the smallest curvature or curvature radius, or the average curvature or average curvature radius may be a reference.

Both of the substrates may have a difference in curvature or curvature radius within 10%, within 9%, within 8%, within 7%, within 6%, within 5%, within 4%, within 3%, within 2% or within 1%. When a large curvature or curvature radius is CL and a small curvature or curvature radius is CS, the difference in curvature or curvature radius is a value calculated by 100×(CL−CS)/CS. In addition, the lower limit of the difference in curvature or curvature radius is not particularly limited. Since the differences in curvatures or curvature radii of two outer substrates can be the same, the difference in curvature or curvature radius may be 0% or more, or more than 0%.

The control of such a curvature or curvature radius is useful in a structure in which an optical film and/or a polarizing layer are encapsulated by an adhesive film as in the optical device of the present application.

When both the first and second outer substrates are curved surfaces, both curvatures may have the same sign. In other words, the two outer substrates may be bent in the same direction. That is, in the above case, both the center of curvature of the first outer substrate and the center of curvature of the second outer substrate exist in the same portion of the upper part and the lower part of the first and second outer substrates.

Figure 10:
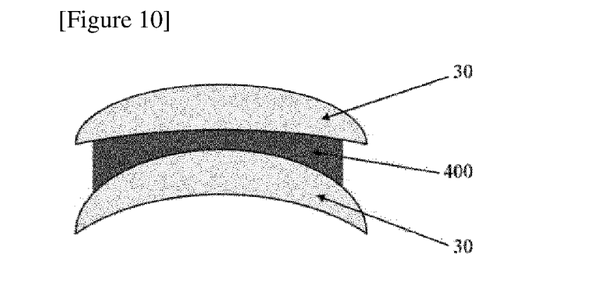

FIG. 10 is a side illustration that an encapsulation portion (400) comprising an optical film exists between first and second outer substrates (30), where the center of the curvature in both the first and second outer substrates (30) exists at the lower part in the drawing.

The specific range of each curvature or curvature radius of the first and second outer substrates is not particularly limited. In one example, the curvature radius of each substrate may be 100 R or more, 200 R or more, 300 R or more, 400 R or more, 500 R or more, 600 R or more, 700 R or more, 800 R or more, or 900 R or more, or may be 10,000 R or less, 9,000 R or less, 8,000 R or less, 7,000 R or less, 6,000 R or less, 5,000 R or less, 4,000 R or less, 3,000 R or less, 2,000 R or less, 1,900 R or less, 1,800 R or less, 1,700 R or less, 1,600 R or less, 1,500 R or less, 1,400 R or less, 1,300 R or less, 1,200 R or less, 1,100 R or less, or 1,050 R or less. Here, R denotes a curved gradient of a circle having a radius of 1 mm. Thus, here, for example, 100 R is the degree of curvature of a circle with a radius of 100 mm or the curvature radius for such a circle. Of course, in the case of a flat surface, the curvature is zero and the curvature radius is infinite.

The first and second outer substrates may have the same or different curvature radii in the above range. In one example, when the curvatures of the first and second outer substrates are different from each other, the curvature radius of the substrate having a large curvature among them may be within the above range.

In one example, when the curvatures of the first and second outer substrates are different from each other, a substrate having a large curvature among them may be a substrate that is disposed in the gravity direction upon using the optical device.

In one example, the lower substrate may have a greater curvature than that of the upper substrate among the first and second outer substrates. In this case, the difference in curvatures of the first and second outer substrates may be in the above-described range. Also, here, when both the first and second outer substrates are curved substrates or when any one of the first and second outer substrates is a curved substrate and the other is a flat substrate, the upper part is a positional relationship determined along the direction toward the convex portion of the curved surface. For example, in the case of FIG. 10, the convex direction is formed from the lower part of the drawing to the upper part, so that the upper outer substrate becomes the upper substrate and the lower outer substrate becomes the lower substrate. In such a structure, a certain level of pressure is generated to the center of the optical device by the restoring force of the curved substrate among the outer substrates attached to each other by the adhesive film (400), whereby the occurrence of defects such as bubbles can be suppressed, reduced, mitigated and/or prevented inside.

For the encapsulation, an autoclave process using an adhesive film may be performed, as described below, and in this process, high temperature and high pressure are usually applied. However, in some cases, such as when the adhesive film applied to the encapsulation is stored at a high temperature for a long time after such an autoclave process, some re-melting or the like occurs, so that there may be a problem that the outer substrates are widening. If such a phenomenon occurs, a force may act on the encapsulated active liquid crystal element and/or polarizing layer, and bubbles may be formed inside.

However, when the curvatures or curvature radii between the substrates are controlled as described above, the net force which is the sum of the restoring force and the gravity may act to prevent the widening and also to withstand the same process pressure as the autoclave, even if the adhesion force by the adhesive film is lowered. In addition, the net force, which is the sum of the restoring force and the gravity, acts at the center of the optical device, so that it is possible to more effectively suppress, reduce, mitigate and/or prevent the occurrence of defects such as bubbles in the region where the actual transmittance and the like are controlled.

Figure 11:
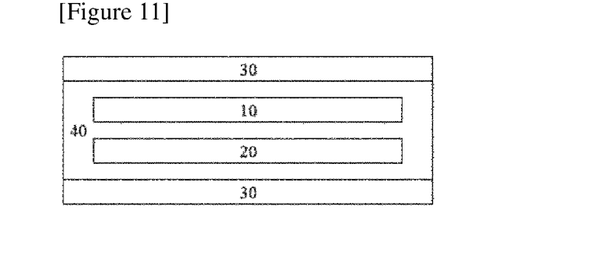

The optical device may further comprise an adhesive film encapsulating the optical film and/or the polarizing layer in the outer substrates. For example, as shown in FIG. 11, the adhesive film (40) may be present between the outer substrate (30) and the optical film (10), between the optical film (10) and the polarizing layer (20) and/or between the polarizing layer (20) and the outer substrate (30), and may be present on the side of the optical film (10) and the polarizing layer (20), suitably, on all the sides.

The adhesive film may encapsulate the optical film (10) and the polarizing layer (20) while attaching the outer substrate (30) and the optical film (10), the optical film (10) and the polarizing layer (20), and the polarizing layer (20) and the outer substrate (30) to each other.

For example, after laminating outer substrates, an optical film, a polarizing layer and an adhesive film according to a desired structure, the above structure can be realized by a method of pressing them in a vacuum state.

As the adhesive film, a known material may be used, and for example, one satisfying physical properties, which are described below, may be selected among a known thermoplastic polyurethane adhesive film (TPU: thermoplastic polyurethane), TPS (thermoplastic starch), polyamide adhesive film, polyester adhesive film, EVA (ethylene vinyl acetate) adhesive film, polyolefin adhesive film such as polyethylene or polypropylene, or polyolefin elastomer film (POE film), and the like.

As the adhesive film, a film having a phase difference in a predetermined range may be used. In one example, the adhesive film may have a front phase difference of 100 nm or less. In another example, the front phase difference may be about 95 nm or less, about 90 nm or less, about 85 nm or less, about 80 nm or less, about 75 nm or less, about 70 nm or less, about 65 nm or less, about 60 nm or less, about 55 nm or less, about 50 nm or less, about 45 nm or less, about 40 nm or less, about 35 nm or less, about 30 nm or less, about 25 nm or less, about 20 nm or less, about 15 nm or less, about 10 nm or less, about 9 nm or less, about 8 nm or less, about 7 nm or less, about 6 nm or less, about 5 nm or less, about 4 nm or less, about 3 nm or less, about 2 nm or less, or about 1 nm or less. The front phase difference may be about 0 nm or more, about 1 nm or more, about 2 nm or more, about 3 nm or more, about 4 nm or more, about 5 nm or more, about 6 nm or more, about 7 nm or more, about 8 nm or more, about 9 nm or more, or about 9.5 nm or more.

An absolute value of the thickness direction phase difference of the adhesive film may be, for example, 200 nm or less. In another example, the absolute value may be about 190 nm or less, 180 nm or less, 170 nm or less, 160 nm or less, 150 nm or less, 140 nm or less, 130 nm or less, 120 nm or less, or 115 nm or less, or may be 0 nm or more, 10 nm or more, 20 nm or more, 30 nm or more, 40 nm or more, 50 nm or more, 60 nm or more, 70 nm or more, 80 nm or more, or 90 nm or more. The thickness direction phase difference may be negative, or may be positive, as long as it has an absolute value within the range.

The front phase difference (Rin) and the thickness direction phase difference (Rth) of the adhesive film may be calculated in the same manner, except that in Equations 1 and 2 above, the thickness (d), the refractive index in the slow axis direction (nx), the refractive index in the fast axis direction (ny) and the refractive index in the thickness direction (nz), are substituted with the thickness (d), the refractive index in the slow axis direction (nx), the refractive index in the fast axis direction (ny) and the refractive index in the thickness direction (nz), of the adhesive film, respectively, to calculate them.

The thickness of the adhesive film may be a thickness of the adhesive film between the outer substrate (30) and the optical film (10), such as an interval between the two, a thickness of the adhesive film between the optical film (10) and the polarizing layer (20), such as an interval between the two, and a thickness of the adhesive film between the polarizing layer (20) and the outer substrate (30), such as an interval between the two.

The thickness of the adhesive film is not particularly limited, which may be, for example, in a range of about 200 μm to 600 μm or so. Here, the thickness of the adhesive film may be a thickness of the adhesive film between the outer substrate (30) and the optical film (10), such as an interval between the two, a thickness of the adhesive film between the optical film (10) and the polarizing layer (20), such as an interval between the two, and a thickness of the adhesive film between the polarizing layer (20) and the outer substrate (30), such as an interval between the two.

The optical device may further comprise any necessary configuration other than the above configurations, and for example, comprise a known configuration such as a retardation layer, an optical compensation layer, an antireflection layer and a hard coating layer in a proper position.

The method for manufacturing the optical device of the present application is not particularly limited. In one example, the optical device may be manufactured through an autoclave process for the above-described encapsulation.

For example, the method for manufacturing the optical device may comprise a step of encapsulating an optical film and/or a polarizing layer between first and second outer substrates disposed to face each other through an autoclave process using an adhesive film. In this process, details including a difference in curvatures of the first and second outer substrates are as described above.

The autoclave process may be performed by disposing an adhesive film and an active liquid crystal element and/or a polarizing layer between outer substrates in accordance with the desired encapsulation structure, and heating/pressurizing them.

For example, an optical device as shown in FIG. 11 may be formed by disposing an outer substrate (30), an adhesive film (40), an optical film (10), an adhesive film (40), a polarizing layer (20), an adhesive film (40) and an outer substrate (30) in this order, and heating/pressurizing the laminate, in which the adhesive film (40) is also disposed on the sides of the optical film (10) and the polarizing layer (20), by an autoclave process.

The conditions of the autoclave process are not particularly limited, and it may be performed under an appropriate temperature and pressure, for example, depending on the type of the applied adhesive film. The temperature of a typical autoclave process is about 80° C. or more, 90° C. or more, 100° C. or more, and the pressure is 2 atmospheres or more, without being limited thereto. The upper limit of the process temperature may be about 200° C. or less, 190° C. or less, 180° C. or less, or 170° C. or less or so, and the upper limit of the process pressure may be about 10 atmospheres or less, 9 atmospheres or less, 8 atmospheres or less, 7 atmospheres or less, or 6 atmospheres or less or so.

Such an optical device can be used for various applications, and for example, can be used for eyewear such as sunglasses or AR (augmented reality) or VR (virtual reality) eyewear, an outer wall of a building or a sunroof for a vehicle, and the like.

In one example, the optical device itself may be a sunroof for a vehicle.

For example, in an automobile including an auto body in which at least one opening is formed, the optical device or the sunroof for a vehicle attached to the opening can be mounted and used.

At this time, when the curvatures or curvature radii of the outer substrates are different from each other, a substrate having a smaller curvature radius, that is, a substrate having a larger curvature, can be arranged in the gravity direction.

The sunroof is a fixed or operating (venting or sliding) opening on a ceiling of a vehicle, which may mean collectively a device that can function to allow light or fresh air to enter the interior of the vehicle. In the present application, the method of operating the sunroof is not particularly limited, and for example, it can be manually operated or driven by a motor, where the shape, size or style of the sunroof may be appropriately selected according to the intended use. For example, according to the operation method, the sunroof may be exemplified by a pop-up type sunroof, a spoiler (tile & slide) type sunroof, an inbuilt type sunroof, a folding type sunroof, a top-mounted type sunroof, a panoramic roof system type sunroof, a removable roof panels (t-tops or targa roofs) type sunroof or a solar type sunroof, and the like, but is not limited thereto.

An exemplary sunroof of the present application may comprise the optical device of the present application, and in this case, as for the details of the optical device, the contents described in the items of the optical device may be equally applied.

Advantageous Effects

The present application provides an optical device capable of preventing defects such as short circuits even when an external power source has been connected in an encapsulated structure.

MODE FOR INVENTION

Hereinafter, the present application will be described in more detail with reference to Examples, but the scope of the present application is not limited to the following examples.

Example 1

An optical film having a GH (guest-host) liquid crystal layer as a light modulation layer was produced. In a state where two PC (polycarbonate) films (110 and 150 in FIG. 1), in which ITO (indium tin oxide) electrode layers (120 and 140 in FIG. 1) and a liquid crystal alignment film (not shown in FIG. 1) were sequentially formed on one side, were disposed to face each other so that a cell gap of about 12 µm or so was maintained, the optical film was manufactured by injecting a mixture of a liquid crystal host (Merck's MAT-16-969 liquid crystals) and a dichroic dye guest (BASF, X12) therebetween and sealing the edges with a sealant. In the opposite arrangement of the PC films, the surfaces, on which the alignment films were formed, were disposed to face each other.

On the other hand, the sealant was formed as shown in FIG. 8 upon the opposite arrangement, and when the portion formed by the light modulation layer (the GH liquid crystal layer) (130) was called the inside of the sealant (160), terminals were formed in the electrode layers (140, 120) formed on the outside to form second regions, and then an insulating layer was formed therebetween. The insulating layer was formed by cutting a PE (polyethylene) film to an appropriate size and disposing it between the second regions.

The optical film and a PVA (polyvinyl alcohol)-based polarizing layer were encapsulated between two outer substrates with a thermoplastic polyurethane adhesive film (thickness: about 0.38 mm, manufacturer: Argotec, product name: ArgoFlex) to produce an optical element. Here, as the outer substrates, glass substrates having a thickness of about 3 mm or so were used, where a substrate having a curvature radius of about 1030 R (first outer substrate) and a substrate having a curvature radius of 1000 R (second outer substrate) were used. A laminate was produced by laminating the first outer substrate, the adhesive film, the optical film, the adhesive film, the polarizing layer, the adhesive film and the second outer substrate in this order and also disposing the adhesive film on all sides of the optical film (the second outer substrate was disposed in the gravity direction as compared to the first outer substrate). Thereafter, an autoclave process was performed at a temperature of about 100° C. and a pressure of about 2 atmospheres or so to produce the optical element.

When the external power source was connected to the second region (that is, the region of the electrode layer where the terminals were formed) of the optical device formed in this manner to drive the optical device, the switching between the transparent mode and the black mode was efficiently performed and the short circuit phenomenon did not occur in the process.

The invention claimed is:
1. An optical device comprising:
an optical film, wherein the optical film comprises:
a first base film and a second base film;
a light modulation layer existing between the first and second base films;
electrode layers formed on surfaces of the first and second base films that face the light modulation layer, wherein each electrode layer comprises a first region capable of applying an electric field to the light modulation layer, and a second region connecting the electrode layer to an external power source so that the first region can apply the electric field, wherein the second region on the first base film and the second region on the second base film face each other, wherein, in each electrode layer, the second region surrounds the first region, and the second region comprises a region A which is electrically connected to the first region and a region B which is not electrically connected to the first region; and
an insulating layer disposed between the facing second regions of the first and second base films.
2. The optical device according to claim 1, wherein a region A on the first base film does not face a region A on the second base film.
3. The optical device according to claim 1, further comprising:
a sealant attaching the first and second base films to each other, wherein the sealant is disposed at the boundaries of the first and second regions of the first and second base films.
4. The optical device according to claim 1, wherein the light modulation layer comprises a liquid crystal host and an anisotropic dye guest and is capable of switching between at least two differently oriented states.
5. The optical device according to claim 4, wherein the at least two differently oriented states comprise a vertically oriented state and a horizontally oriented state.
6. The optical device according to claim 1, further comprising a linear polarizer.
7. The optical device according to claim 5, further comprising a linear polarizer, wherein the linear polarizer is disposed so that an angle formed by an average optical axis of the light modulation layer at the horizontally oriented state and a light absorption axis of the linear polarizer is in a range of 80 degrees to 100 degrees, or in a range of 35 degrees to 55 degrees.
8. The optical device according to claim 1, further comprising alignment films present on the surfaces of the first and second base films facing the light modulation layer.
9. The optical device according to claim 8, wherein the angle formed by an orientation directions of the alignment films on the first and second base films is in a range of −10 degrees to 10 degrees, or in a range of 80 degrees to 90 degrees.
10. The optical device according to claim 1, further comprising:
a linear polarizer disposed on at least one side of the optical film, and wherein the optical film further comprises alignment films present on the surfaces of the first and second base films facing the light modulation layer, and an angle formed by the orientation direction of the alignment film formed on the base film close to the linear polarizer among the first and second base films and a light absorption axis of the linear polarizer is in a range of 80 degrees to 90 degrees.

11. The optical device according to claim 1, further comprising:
two outer substrates, wherein the optical film is present between the outer substrates.

12. The optical device according to claim 11, further comprising:
an encapsulant, wherein an entire surface of the optical film is encapsulated by the encapsulant between the two outer substrates.

13. An automobile, comprising:
an auto body having one or more openings formed therein;
and the optical device of claim 1 mounted to the one or more openings.

\* \* \* \* \*